TYPICAL LOOP OPENING

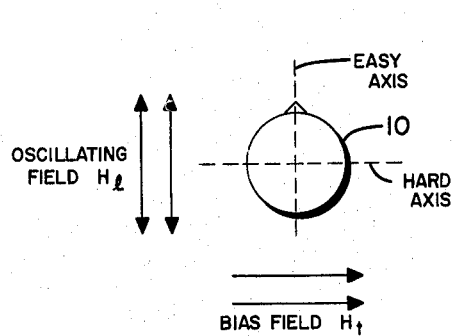
Fig. 1
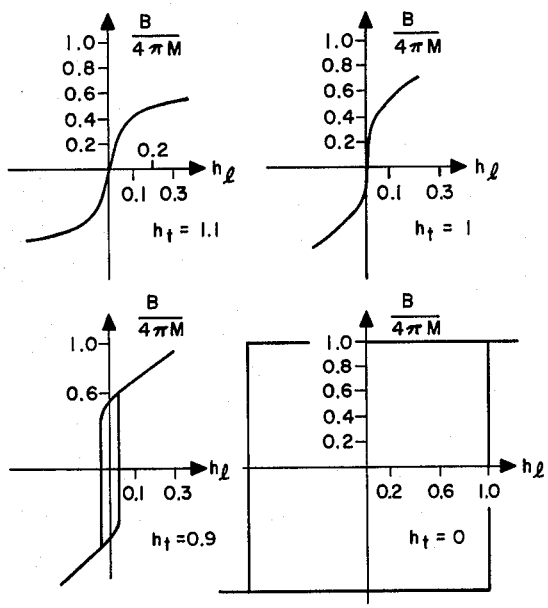
Fig. 2
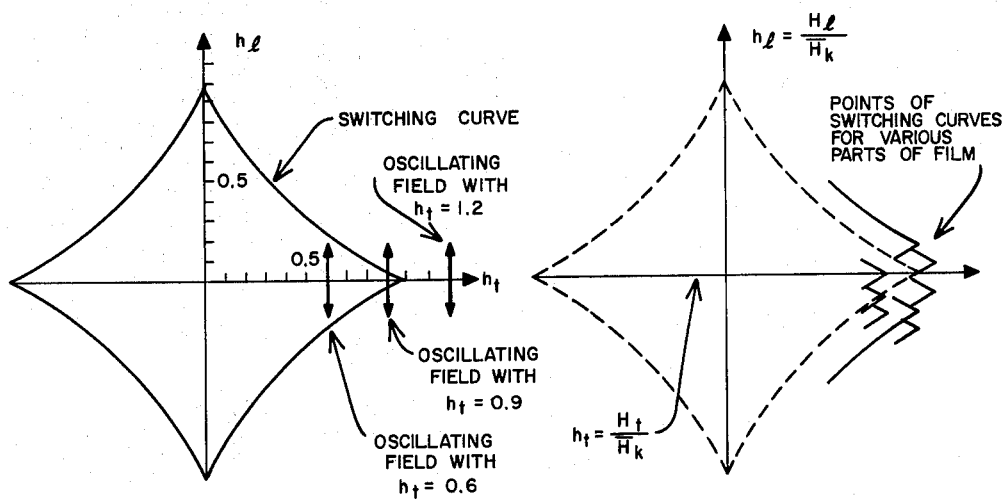
Fig. 3   Fig. 4
INVENTORS
ARLON J. HUNT
HENRY N. OREDSON
ERNEST J. TOROK
ROBERT A. WHITE
BY
ATTORNEY

INVENTORS
ARLON J. HUNT
HENRY N. OREDSON
ERNEST J. TOROK
ROBERT A. WHITE

ATTORNEY

United States Patent Office 3,260,928
Patented July 12, 1966

3,260,928
METHOD OF MEASURING THE EASY-AXIS AND $H_k$ PROBABILITY DENSITY FUNCTIONS FOR THIN FERROMAGNETIC FILMS USING THE LONGITUDINAL PERMEABILITY HYSTERESIS LOOP
Arlon J. Hunt, Minneapolis, and Henry N. Oredson, Ernest J. Torok, and Robert A. White, St. Paul, Minn., assignors to Sperry Rand Corporation, New York, N.Y., a corporation of Delaware
Filed Jan. 21, 1963, Ser. No. 252,742
5 Claims. (Cl. 324—34)

This invention relates in general to magnetic memory elements, and more particularly to an apparatus and a method for the determination and measurement of the easy axis and $H_k$ probability density functions of thin ferromagnetic films having the magnetic property of uniaxial anisotropy.

A thin film having the property of uniaxial anisotropy may be assumed to be composed of many small homogeneous magnetic regions each of which acts as an ideal uniaxial domain. The term "thin" as regards a ferromagnetic film may be considered the property of a three-dimensional element of magnetic material having a thin dimension which is substantially less than the width and length thereof wherein no domain walls can exist parallel to the large surface of the element. Each region has a different easy axis orientation producing a magnetically inhomogeneous film with the net effect of all regions producing a mean anisotropy axis. The present invention presents a novel method of measuring the inhomogeneity in the film's easy axis orientation and the magnitude of its anisotropy field, $H_k$. For purposes of this invention, the term "easy axis" shall mean the film's mean anisotropy axis and the term "hard axis" shall mean a line orthogonal to said easy axis.

Definitions

An inhomogeneous thin film having the property of uniaxial anisotropy is assumed to be composed of many small homogeneous magnetic regions, each of which acts as an ideal uniaxial domain. Each region has a different easy axis orientation which differs from the mean easy-axis of the film by an angle $\alpha$. Each region has a different anisotropy field, $H_k$, which differs from the mean value $\overline{H}_k$ by $\delta H_k$.

We define $$\Delta \equiv \delta H_k / \overline{H}_k$$

Let the fraction of the film with its easy axis lying between $\alpha$ and $\alpha + \delta \alpha$ be $P'_\alpha(\alpha, \delta\alpha)$. The easy axis probability density function is then $$P_\alpha(\alpha) = \lim_{\delta\alpha \to 0} \frac{P'_\alpha(\alpha, \delta\alpha)}{\delta\alpha} \quad (1)$$

Let the fraction of the film with $\delta H_k / \overline{H}_k$ between $\Delta$ and $\Delta + \delta\Delta$ be $$P'_\Delta(\Delta, \delta\Delta)$$

The $H_k$ probability density function is $$P_\Delta(\Delta) = \lim_{\delta\Delta \to 0} \frac{P'_\Delta(\Delta, \delta\Delta)}{\delta\Delta} \quad (2)$$

Let the fraction of the film that has $\alpha$ between $\alpha_0$ and $\alpha_0 + \delta\alpha$, as well as $\Delta$ between $\Delta_0$ and $\Delta_0 + \delta\Delta$ be $$P'(\alpha_0, \delta\alpha, \Delta_0, \delta\Delta)$$

We define the probability density function of the inhomogeneities as $$P(\alpha_0, \Delta_0) = \lim_{\delta\Delta \to 0} \lim_{\delta\alpha \to 0} \frac{P'(\alpha_0, \delta\alpha, \Delta_0, \delta\Delta)}{\delta\alpha\delta\Delta} \quad (3)$$

It is this last quantity, $P(\alpha_0, \Delta_0)$ that is determined using the method of this invention.

We define $\alpha_{90}$ as that angle for which $$0.90 = \int_{-\alpha_{90}}^{\alpha_{90}} P_\alpha(\alpha) d\alpha \quad (4)$$

Likewise, we define $\Delta_{90}$ such that $$0.90 = \int_{-\Delta_{90}}^{\Delta_{90}} P_\Delta(\Delta) d\Delta \quad (5)$$

Note that $$P_\alpha(\alpha) = \int_{\text{all}\Delta} P(\alpha, \Delta) d\Delta \quad (5.1)$$

and $$P_\Delta(\Delta) = \int_{\text{all}\alpha} P(\alpha, \Delta) d\alpha \quad (5.2)$$

If a transverse field $H_t$ or a longitudinal field $H_l$ is applied along the hard and easy axes of a film, respectively, we define $$h_t \equiv H_t / \overline{H}_k \quad (6)$$

and $$h_l \equiv H_l / \overline{H}_k \quad (6.1)$$

Accordingly, it is a primary object of this invention to provide an apparatus and a method of determining the inhomogeneity in the easy axis orientation and in the magnitude of the anisotropy field, $H_k$, in thin films, and in particular the probability density function of the film.

Another object of this invention, is to provide an apparatus and a method of determining accurately the magnitude and direction of the mean anisotropy field of the film, $\overline{H}_k$.

Another object of this invention is to provide an apparatus and a method of determining the probability density function of a thin film's easy axis orientation and to plot this probability density function by automatic recording means.

Another object of this invention is to provide an apparatus and a method of determining the probability density function of a thin film's anisotropy field, $H_k$ and to plot this probability density function by automatic recording means.

A further and more general object of this invention is to provide a method of determining the magnetic properties of thin ferromagnetic films.

These and other more detailed and specific objectives will be disclosed in the course of the following specification, reference being had to the accompanying drawings, in which:

FIG. 1 is an illustration of a thin ferromagnetic film and the orientation of the oscillating and bias fields with respect to the film's easy axis.

FIG. 2 shows $B_1$ versus $H_1$ curves of an ideal film for four different magnitudes of hard axis bias with an oscillating easy axis field.

FIG. 3 is a plot of a switching curve for a magnetically homogeneous, or ideal, film.

FIG. 4 is a plot of the switching curves for a magnetically inhomogeneous film.

Method of measurement (a) A film is biased along the hard axis by a variable bias field, $H_t$.

(b) A small, oscillating field, $H_1$, is applied along the easy axis, and (c) A pickup coil senses film flux changes along the easy axis.

This method of measurement may use a conventional setup as used for measuring longitudinal permeability, such as disclosed in James V. Drexler et al., patent application Serial No. 211,018, filed July 19, 1962, now Patent No. 3,214,688, and assigned to the same assignee as is the present invention:

$$\mu_1 \equiv (\partial B_1/\partial H_1)_{H_T} = \text{const.}$$

which is the slope of the observed hysteresis loop. The $B_1$—$H_1$ curves observed on the oscilloscope for an ideal film are illustrated in FIG. 2 for four different values of hard axis bias and a large oscillating field.

Now, if we increase $h_t$ from zero to one, using a small oscillating field, the loop opens up rather suddenly at a point where $h_t$ is somewhat less than one. As $h_t$ is increased past one, the loop closes again. The term $\Delta_{90}$ is roughly one-half the difference of $h_t$ just before the loop closes and $h_t$ just after it opens up.

Figure 6:
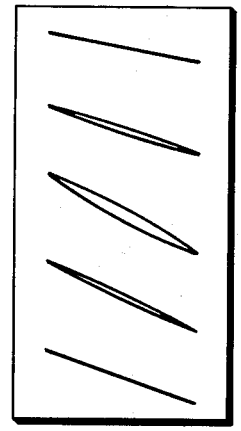
FIG. 6 is an illustration of typical variations of hysteresis loop openings.

The reason the loop opens and closes is as follows: an ideal film with $h_t \ge 1$ will not have an open loop because the film is being operated outside the switching threshold curve (the curve of the fields just necessary to cause the magnetization vector to go into unstable equilibrium). FIG. 6 is an example of such curves as seen on an oscilloscope. For $h_t < 1$ the loop will be open if a sufficiently large oscillating field is used. However, the amplitude of the oscillating field may be made sufficiently small so the magnetic induction of the film is not driven completely around the hysteresis loop, but moves forth and back in the top-half or the bottom-half of the loop. In this case, only a line will be shown on the oscilloscope of FIG. 9. Only if the amplitude of the oscillating field $h_1$ is large enough to drive the magnetic induction of the film around the hysteresis loop will an open loop appear on the oscilloscope. This is illustrated in FIGS. 3 and 6. Of the three oscillating fields pictured only the field corresponding to $h_t = 0.9$ will cause the hysteresis loop to open up because only that field will cause the film to switch forth and back.

A non-ideal film is thought of as being made up of many small regions that individually act as ideal films, each region having a slightly different easy axis orientation and $H_k$. Therefore, if the loop opens up for a given $H_t$ when a very small oscillating field ($h_1 < 0.020\ H_k$) is used, this means that there is some portion of the film for which $H_t = H_k$.

The method of determining the probability density function $P(\alpha, \Delta)$ defined in Eq. 3 is a refinement of the method discussed above. Each small portion of the film has a switching curve like that of FIG. 3, each with a slightly different easy axis orientation and a slightly different $H_k$.

Figure 5:
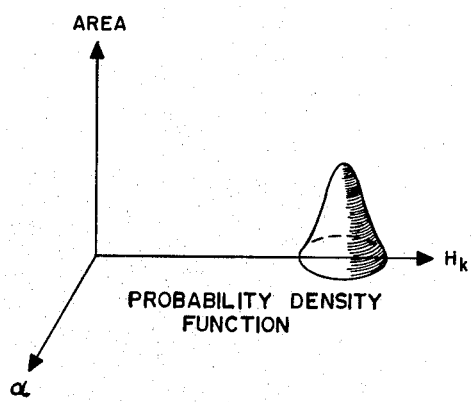
FIG. 5 is a three-dimensional plot of an $H_k$—easy axis probability density function.

Let us apply this small oscillating field and a bias of $H_t$ to a film whose easy axis is now misaligned by an angle $\alpha$ with our coordinate system of FIG. 1. If the permeability loop opens up (i.e., it encloses a finite area) a part of the film has both an $H_k$ equal to the applied bias field $H_t$ and an easy axis making an angle $\alpha$ with the mean easy axis of the film. The area of the loop is directly proportional to the percentage of the film that has both that particular $\alpha$ and $H_k$. Thus, by plotting the area enclosed by the loop as a function of $H_k$ and $\alpha$ one can experimentally measure the probability density function, $P(\alpha, \Delta)$ and plot it on a three-dimensional graph, such as FIG. 5. Illustrations of typical loop openings are shown in FIG. 6.

Figure 7:
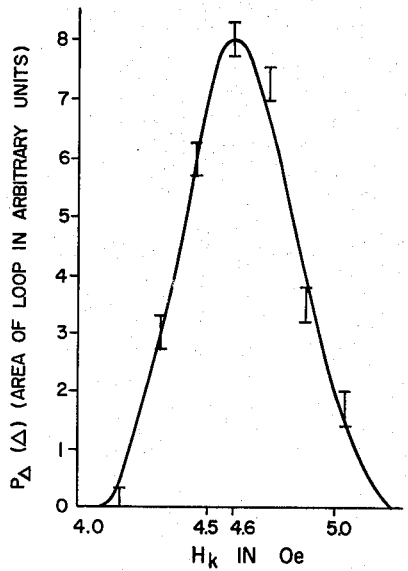
FIG. 7 is an illustration of a hand plot of an $H_k$ probability density function.
Figure 8:
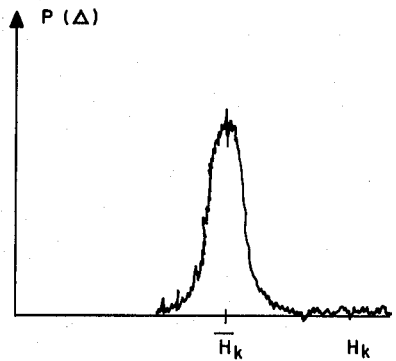
FIG. 8 is an illustration of an automatic plot of an $H_k$ probability density function.

It has been determined that for most films $$P(\alpha, \Delta) = P_\alpha(\alpha) P_\Delta(\Delta)$$

i.e., that the $\alpha$ and $\Delta$ probability densities are independent. In this case, one can plot $P_\Delta(\Delta)$ by fixing the position of the film and plotting the area enclosed by the permeability loop versus the magnitude of the bias field, see FIGS. 7 and 8 for examples of such curves. In FIG. 7 the area was measured with the apparatus of FIG. 9 by hand and plotted point by point, while in FIG. 8 the area was plotted directly by an X–Y recorder with the apparatus of FIG. 10. One can also plot $P_\alpha(\alpha)$ by fixing the normalized transverse bias $H_t = 1$ and plotting the area enclosed by the permeability loop versus the angular relation of the film and the bias field.

In case $\alpha_{90}$ is small, say a fraction of a degree, it is usually better to apply a small longitudinal bias field $h_1$ rather than rotate the film. This bias field rotates the film's magnetization field an angle arc tan $h_1/h_t$.

Most probability densities appear to be Gaussian curves. In this case $\alpha_{90}$ is half that angle between which the density rises from one-quarter of its maximum value, goes to a maximum and falls to one-quarter of its maximum value. In a similar manner, $\Delta_{90}$ may be determined with both parameters quickly by this method.

Apparatus

Figure 9:
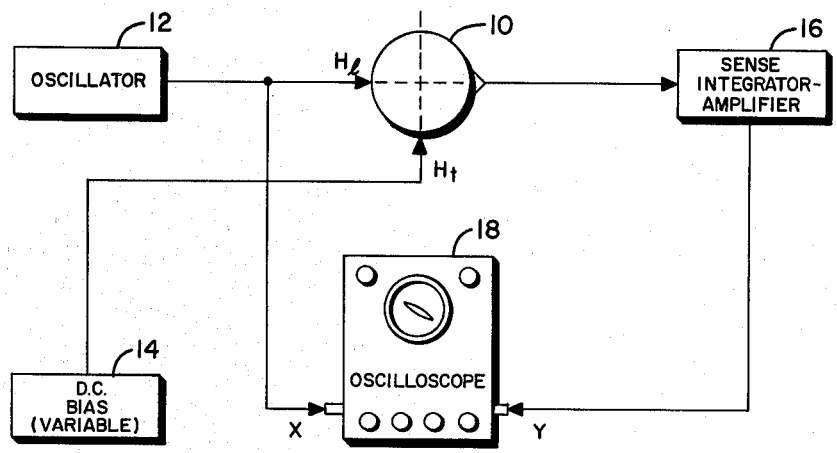
FIG. 9 is a block diagram of an apparatus for the determination of the $H_k$ and easy axis probability density functions.

A block diagram of a test apparatus for hand plotting of the test results is illustrated in FIG. 9 and is designed to permit a maximum in flexibility allowing the same basic instrument to be used for all measurements. Fields to film 10 are provided by two cube coils and one set of Helmholtz coils. The film and/or pickup coils are rotatable, allowing a variety of drive field and sense means orientations. The basic drive frequency of the apparatus of 1000 c.p.s. is provided by oscillator 12. Either an integrator-amplifier or a tuned high-gain amplifier may be used in the sense circuit. One cube coil is used to cancel the earth's field, the other to provide the oscillating field, $h_1$, with the Helmholtz coils being used to provide the bias field $h_t$ from D.C. bias generator 14. The output of the sense coil is coupled to a sense integrator-amplifier 16 and observed on an oscilloscope 18.

In order to obtain a higher accuracy, the measurements of the probability density function were made using an oscillating field of low amplitude. The uncertainty in easy axis inhomogeneity in radians is given by the ratio of the drive field $h_1$ to $H_k$; the uncertainty in $\Delta$ is given by approximately twice that ratio, as may be seen from FIG. 3. As random noise makes observations of the permeability loops difficult at drives of less than 0.020 oe. a narrow band width amplifier tuned to the base frequency is used when fields of lower amplitude are desired. This will allow the observation of permeability loops using amplitudes down to 0.0001 oe. Distortion of the loop at such small drives due to neglecting higher frequency components is unimportant because the undistorted loop is very nearly an ellipse (FIG. 6).

Figure 10:
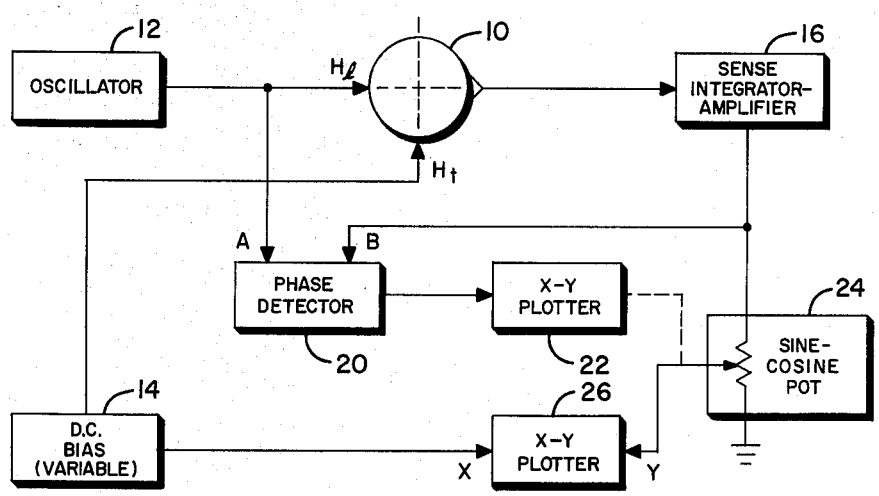
FIG. 10 is a block diagram of an apparatus for an automatic plotting of the $H_k$ and easy axis probability density functions.

As area measurements are extremely difficult and tedious to perform by observing the oscilloscope 18 display of FIG. 9, a block diagram of an apparatus to make this measurement directly is illustrated in FIG. 10. Its function is as follows: The area of the ellipse is given by $$\pi AB \sin \theta$$

where A and B are the amplitudes of the X and Y axes drives to the oscilloscope displaying the permeability loop respectively and $\theta$ is their angular difference. Since A is a constant, $\pi AB \sin \theta$ is proportional to $B \sin \theta$. Phase detector 20 provides an output voltage proportional to $\theta$ which voltage is coupled to X–Y plotter 22 whose output is a servo angle proportional to the input voltage. Plotter 22 drives sine-cosine potentiometer 24 whose input is a voltage whose amplitude is proportional to B and whose output ($B \sin \theta$) is coupled to the Y axis input of plotter 26. The X axis input of plotter 26 is coupled to D.C. bias generator 14.

It is understood that suitable modifications may be made in the structure as disclosed provided such modifications come within the spirit and scope of the appended claims.

Having now, therefore, fully illustrated and described our invention, what we claim to be new and desire to protect by Letters Patent is:

1. A method of determining the $H_k$ and easy axis probability density functions of a thin ferromagnetic film having an easy axis comprising the steps of:
  applying a steady bias field to said film orthogonal to said film's easy axis,
  applying a small oscillating field of less than 0.020 $H_k$ to said film along said film's easy axis,
  varying the magnitude and direction of the said bias field with respect to said film's easy axis,
  recording the energy loss due to irreversible changes of the film's magnetization per cycle of said small oscillating field.

2. A method of determining the $H_k$ and easy axis probability density functions of a thin ferromagnetic film having an easy axis comprising the steps of:
  applying a steady bias field to said film orthogonal to said film's easy axis,
  applying a small oscillating field of less than 0.020 $H_k$ to said film along said film's easy axis,
  varying the magnitude and direction of the said bias field with respect to said film's easy axis,
  detecting the variations in the film's magnetization along said film's easy axis,
  driving a first axis of an oscilloscope display by said oscillating field,
  driving a second axis of the oscilloscope display by a signal caused by said detected variations in the film's magnetization along said film's easy axis,
  recording the energy loss due to the irreversible changes of the film's magnetization per cycle of said oscillating field as the area enclosed by the loop displayed by said oscilloscope,
  plotting the recorded data as the $H_k$ and easy-axis probability density functions.

3. A method of determining the $H_k$ and easy axis probability density functions of a thin film having an easy axis, comprising the steps of:
  applying a steady bias field to said film orthogonal to said film's easy axis,
  applying a small oscillating field of less than 0.020 $H_k$ to said film along said film's easy axis,
  varying the magnitude and direction of the said bias field with respect to said film's easy axis,
  detecting the magnitude of the varying small oscillating field as a first signal A,
  detecting the magnitude of the variations in the film's magnetization along said film's easy axis as a second signal B,
  determining the phase difference between said first and second signals as an angle $\theta$,
  recording the function $AB \sin \theta$ as the $H_k$ and easy axis probability density functions.

4. A method of determining the $H_k$ probability density function of a thin ferromagnetic film having an easy axis comprising the steps of:
  applying a steady bias field to said film orthogonal to said film's easy axis,
  applying a small oscillating field of less than 0.020 $H_k$ to said film along said film's easy axis,
  varying the magnitude of the said bias field,
  recording the energy loss due to irreversible changes of the film's magnetization per cycle of said small oscillating field.

5. A method of determining the easy axis probability density function of a thin ferromagnetic film having an easy axis comprising the steps of:
  applying a steady bias field to said film orthogonal to said film's easy axis,
  applying a small oscillating field of less than 0.020 $H_k$ to said film along said film's easy axis,
  varying the direction of the said bias field with respect to said film's easy axis,
  recording the energy loss due to irreversible changes of the film's magnetization per cycle of said small oscillating field.

No references cited.

WALTER L. CARLSON, *Primary Examiner.*

RICHARD B. WILKINSON, *Examiner.*

R. J. CORCORAN, *Assistant Examiner.*